United States Patent
Kopp et al.

(10) Patent No.: US 8,666,211 B2
(45) Date of Patent: Mar. 4, 2014

(54) STRUCTURE AND METHOD FOR ALIGNING AN OPTICAL FIBER ON AN OPTICAL WAVEGUIDE

(75) Inventors: Christophe Kopp, Fontanil-Cornillon (FR); Badhise Ben Bakir, Grenoble (FR); Stéphane Bernabe, Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 31 days.

(21) Appl. No.: 12/582,043

(22) Filed: Oct. 20, 2009

(65) Prior Publication Data

US 2010/0098379 A1 Apr. 22, 2010

(30) Foreign Application Priority Data

Oct. 20, 2008 (FR) ..................... 08 57124

(51) Int. Cl.
*G02B 6/30* (2006.01)
*G02B 6/34* (2006.01)

(52) U.S. Cl.
USPC .................. 385/49; 385/37; 385/50; 385/130

(58) Field of Classification Search
USPC .............. 385/14, 37, 43, 49, 50, 88, 129–132
See application file for complete search history.

(56) References Cited

U.S. PATENT DOCUMENTS

| 5,208,800 | A | * | 5/1993 | Isobe et al. | 369/112.27 |
| 5,420,947 | A | * | 5/1995 | Li et al. | 385/37 |
| 5,793,521 | A | * | 8/1998 | O'Brien et al. | 359/344 |
| 5,854,868 | A | * | 12/1998 | Yoshimura et al. | 385/50 |
| 6,280,100 | B1 | | 8/2001 | Haake | |
| 6,748,141 | B2 | * | 6/2004 | Kennedy et al. | 385/49 |
| 6,760,359 | B2 | * | 7/2004 | Evans | 372/102 |
| 7,068,870 | B2 | * | 6/2006 | Steinberg et al. | 385/14 |
| 7,183,759 | B1 | | 2/2007 | Malendevich | |
| 7,184,386 | B2 | * | 2/2007 | Nikolai et al. | 369/112.09 |
| 7,245,803 | B2 | * | 7/2007 | Gunn et al. | 385/37 |
| 7,298,945 | B2 | * | 11/2007 | Gunn et al. | 385/37 |
| 7,379,641 | B1 | * | 5/2008 | Johnson | 385/52 |
| 7,650,052 | B2 | * | 1/2010 | Krishnamoorthy et al. | 385/14 |
| 2007/0036500 | A1 | | 2/2007 | Suzuki | |
| 2009/0290837 | A1 | * | 11/2009 | Chen et al. | 385/37 |

FOREIGN PATENT DOCUMENTS

| WO | 0205000 A | 1/2002 |
| WO | 2004088801 A | 10/2004 |

OTHER PUBLICATIONS

Search Report issued in French Application No. 08/57124 on May 12, 2009.
"Silicon-on-insulator nanophotonics" Wim Bogaerts, et al., Proceedings of the SPIE, SPIE, Bellingham, VA, US, vol. 5956, No. 1, Sep. 16, 2005, pp. 1-15, XP002488407, ISSN: 0277-786X.

(Continued)

*Primary Examiner* — Daniel Petkovsek
(74) *Attorney, Agent, or Firm* — Vedder Price PC

(57) ABSTRACT

An optical device including at least one first optical waveguide coupled to a second optical waveguide of smaller cross-section which penetrates into it on the side of a first end. The first optical waveguide is capable of being coupled with an optical fiber on the side of a second end. A surface of the first optical waveguide includes a diffraction grating capable of introducing-extracting-sending back light into and from the first optical waveguide.

3 Claims, 4 Drawing Sheets

(56) References Cited

OTHER PUBLICATIONS

"Grating Couplers Fabricated by Electron-Beam Lithography for Coupling Free-Space Light Into Nanophotonic Devices", Masturzo, S.A., et al., IEEE Transactions on Nanotechnology, IEEE Service Center, Piscataway, NJ, US, vol. 6, No. 6, (Nov. 1, 2007), pp. 622-626, XP011195421, ISSN: 1536-125X.

* cited by examiner

STRUCTURE AND METHOD FOR ALIGNING AN OPTICAL FIBER ON AN OPTICAL WAVEGUIDE

BACKGROUND OF THE INVENTION

1. Field of the Invention

The present invention relates to an integrated optical circuit and, more specifically, to a method and a device for aligning an optical fiber and a waveguide formed at the surface of an integrated optical circuit.

2. Discussion of the Related Art

Integrated optical circuits are more and more used in telecommunications, especially for the transmission, the processing, or the storage of data. Integrated optical circuits may have many functions, such as multiplexing, demultiplexing, modulation, demodulation, spectral routing, amplification, storage, filtering, resonator functions, etc.

Integrated optical or optoelectronic circuits are generally formed in and on semiconductor wafers similar to those used in microelectronics. An integrated optical circuit comprises one or several elementary optical components processing one or several light beams, the light beams being conveyed between elementary optical components by optical waveguides.

The integration of an increasing number of functions on a same chip requires the miniaturization of integrated optical circuits and of the associated optical waveguides. When waveguides have dimensions below one micrometer, it is spoken of submicronic or nanometric waveguides. Currently, waveguides may have cross-sections on the order of 0.5×0.2 $\mu m^2$.

For mid and long range transmissions, that is, within a range from a few meters to several kilometers, optical fibers are the preferred optical transportation means. An optical fiber usable in the visible and close infrared range currently has a diameter ranging between 10 $\mu m$ and a few tens of micrometers. Accordingly, it is necessary to use light coupling systems between optical fibers and submicronic waveguides to compensate for the size mismatch imposed by such structures.

FIG. 1 is a perspective view illustrating a known structure for coupling an optical fiber and a submicronic waveguide associated with an integrated optical circuit. This anamorphotic structure is generally called "inverse taper" in the art, after its shape.

The structure of FIG. 1 is formed on a silicon substrate 1 covered with an insulating layer 3, for example made of silicon oxide. A wide waveguide 5, for example made of silicon oxide SiOx, having an optical index ranging between 1.6 and 1.8, is formed on insulating layer 3. Wide guide 5 typically has a cross-section with dimensions on the order of a few micrometers, for example, a 3-$\mu m$ width and a 1-$\mu m$ height, and is intended to be illuminated by an optical fiber (shown in FIG. 1 by an arrow 7) at a first one of its ends, substantially above an edge of support 1.

A submicronic optical waveguide 9, formed at the surface of layer 3, extends into wide waveguide 5 and progressively narrows therein to form a tip 11 on the side of the first end of wide waveguide 5. Submicronic waveguide 9 and tip 11 may be made of silicon (having an optical index of 3.47). It should be noted that an insulating layer, not shown, for example made of stoichiometric silicon oxide of optical index equal to 1.44, extends on top of optical waveguides 5 and 9 to confine the light beams in these waveguides.

In normal operation, a light beam of adapted wavelength and polarization penetrating into wide waveguide 5 enters submicronic waveguide 9. Conversely, a light beam conveyed by submicronic waveguide 9 penetrates into wide waveguide 5.

FIG. 2 illustrates a simplified example of optical inputs/outputs of a chip comprising an integrated optical circuit 13. Many wide waveguides 5 having their first ends located substantially above the chip edges extend on a silicon oxide layer 3 formed on a silicon support. Each wide waveguide 5 is coupled to a submicronic waveguide 9. Submicronic waveguides 9 are connected to integrated optical circuit 13, for example carrying out one or several of the above mentioned functions. As an example, integrated circuit chip 3 may have a surface area ranging between 1 $mm^2$ and 4 $cm^2$ and integrated optical circuit 13 may take up almost the entire surface area.

Wide waveguides 5 have cross-sections on the order of a few square millimeters (for example, with a side length between 1 and 4 $\mu m$). The coupling with an optical fiber typically having a diameter on the order of 10 $\mu m$ is performed via an optical system comprising one or several lenses, another possibility being for the end of each optical fiber to be given a shape ensuring a lens effect.

For the circuit of FIG. 2 to operate properly, each optical fiber must be perfectly aligned with the wide waveguide associated thereto. Several methods have been provided to form this alignment. For example, the integrated optical circuit may be provided to deliver a light beam at the output of wide waveguide 5 and the optical fiber is considered as being aligned when the amount of light received by said fiber is maximum. It is also possible to illuminate wide waveguide 5 with the optical fiber and to detect a light intensity maximum in the submicronic circuit.

However, such methods pose several problems. First, they require providing, in the integrated optical circuit, elements dedicated to the alignment of the optical fibers, for example, light outputs or photodetectors. Further, in the alignment, the integrated optical circuit must be in operation, and thus, for example, electrically supplied. Finally, the wavelength of the light beams used for the alignment necessarily is that of the light beams used in the integrated optical circuit.

There is a need for a device and a method enabling to align an optical fiber on an optical waveguide, independently from the associated integrated optical circuit, from its operating mode, from its operating wavelengths, and from the light polarization states that it requires.

Patent application WO 2004/088801 provides a device comprising, at the surface of a support, a first optical waveguide coupled to a second waveguide of smaller size at one of its ends. A diffraction grating, formed at the surface of the first or second waveguides, is sized to filter beams exhibiting predetermined wavelengths.

SUMMARY OF THE INVENTION

An embodiment of the present invention provides a device and a method for aligning an optical fiber on an optical waveguide which overcomes at least some of the disadvantages of existing devices and methods.

Thus, an embodiment of the present invention provides an optical device comprising at least one first optical waveguide coupled to a second optical waveguide of smaller cross-section which penetrates into it on the side of a first end, the first optical waveguide being capable of being coupled with an optical fiber on the side of a second end, a surface of the first optical waveguide comprising a diffraction grating capable of introducing-extracting-sending back light into and from the first optical waveguide, independently from the second optical waveguide.

According to an embodiment of the present invention, the diffraction grating is formed in a portion remote from the coupling region between the first and second optical waveguides.

An embodiment of the present invention further provides a method for aligning an optical fiber on a free end of a first optical waveguide coupled to a second optical waveguide of smaller cross-section, the method comprising a step of introduction-extraction-sending back of light in a portion of the first optical waveguide, independently from the second optical waveguide.

According to an embodiment of the present invention, the step is a step of introduction of a light beam originating from a light source into the first optical waveguide by means of a light coupling device formed at the surface of the optical waveguide.

According to an embodiment of the present invention, the step is a step of extraction of a light beam from the first optical waveguide by means of a light coupling device formed at the surface of the first optical waveguide, the extracted light beam being detected by a photodetector.

According to an embodiment of the present invention, the step is a step of sending back, into the first optical waveguide, of a light beam originating from the optical fiber by means of a light coupling device formed at the surface of the optical waveguide.

According to an embodiment of the present invention, the light coupling device is a diffraction grating.

According to an embodiment of the present invention, the introduced-extracted-sent back light beam has any wavelength in the visible or close infrared range.

An embodiment of the present invention further provides a method for aligning several optical fibers on several optical waveguides, comprising a step of introduction of a light beam originating from a light source into a first optical waveguide by means of a light coupling device formed at the surface of the first optical waveguide and comprising a step of separation of the light beam into several light beams directed towards each of the optical waveguides.

According to an embodiment of the present invention, the alignment of each optical fiber on the associated optical waveguide is performed by detecting, on its output, a transmitted light power maximum.

The foregoing objects, features, and advantages of the present invention will be discussed in detail in the following non-limiting description of specific embodiments in connection with the accompanying drawings.

DETAILED DESCRIPTION

Figure 1:
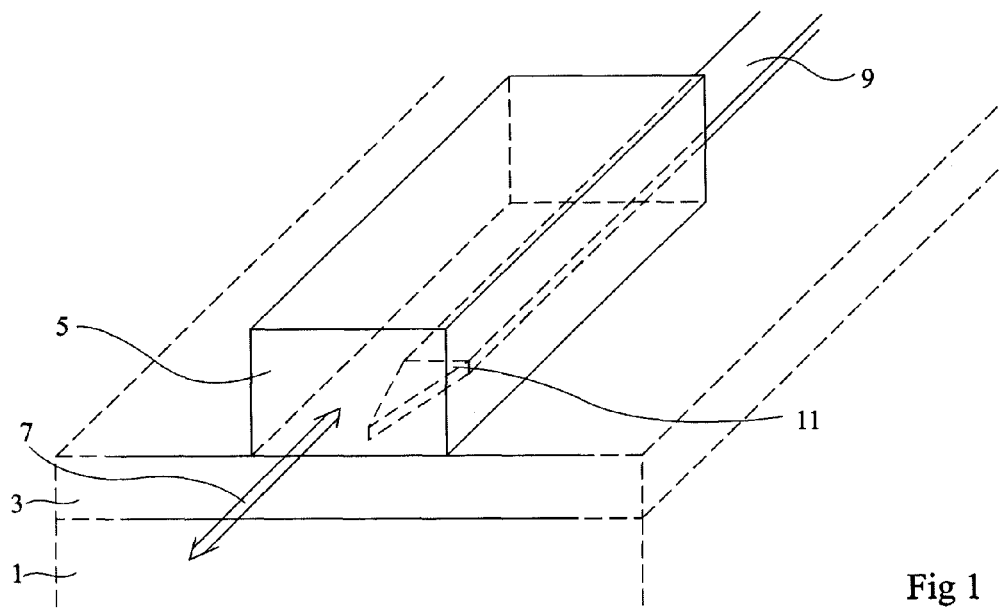
FIG. 1, previously described, illustrates a coupling device of inverse taper type.

For clarity, the same elements have been designated with the same reference numerals in the different drawings and, further, as usual in the representation of integrated optical circuits, the various drawings are not to scale.

Figure 3:
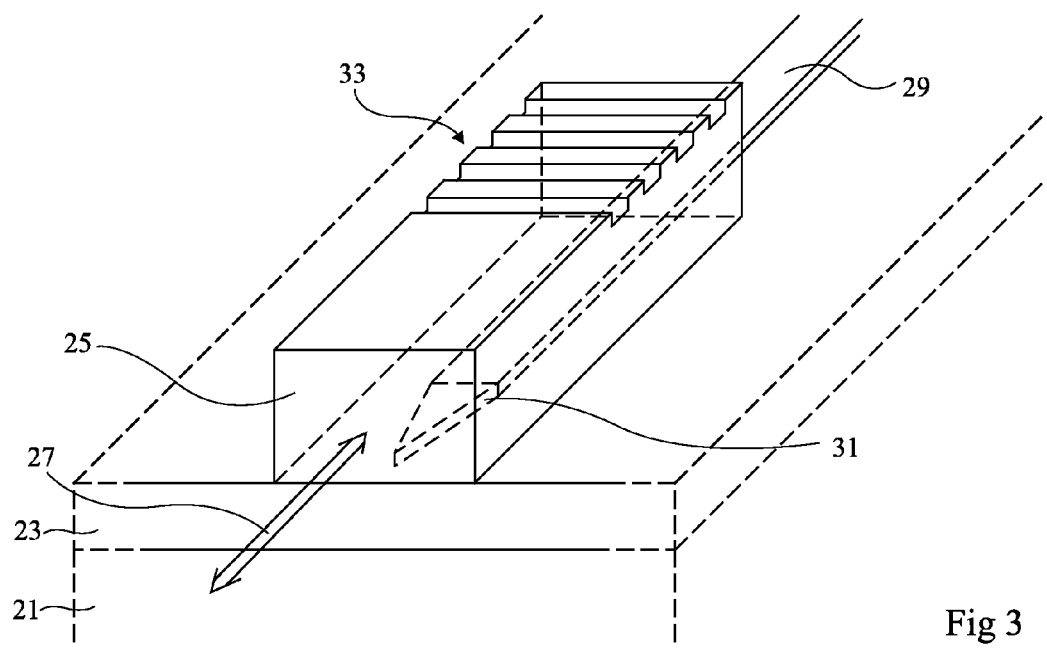
FIG. 3 is a perspective view of a device according to an embodiment of the present invention.

FIG. 3 is a perspective view of a device according to an embodiment of the present invention.

On a support 21, for example made of silicon, is formed an insulating layer 23, for example made of silicon oxide. On insulating layer 23 is formed a wide waveguide 25 for example having a cross-section of a few square micrometers and having one end intended to be illuminated by an optical fiber or to provide a light beam towards an optical fiber (direction of arrow 27 in FIG. 3). In wide waveguide 25 and at the surface of insulating layer 23 is formed a submicronic waveguide 29 for example having a width of approximately 0.5 µm and a height of approximately 0.2 µm. Submicronic waveguide 29 ends with a tip 31 turned towards the end of waveguide 25 forming the interface with the optical fiber. The device further comprises, on top of wide waveguide 25, a diffraction grating 33 allowing an optical coupling (introduction-extraction-sending back of light) with wide waveguide 25. Diffraction grating 33 is formed, in the shown example, of parallel strips perpendicular to the direction of the light, dug at the surface of wide waveguide 25. Diffraction grating 33 may also be formed by any other known technique, especially by forming of parallel metal strips perpendicular to the direction of the light at the surface of wide waveguide 25. As an example, the diffraction grating may be formed of gold strips having a thickness of approximately 200 nm, a 10-µm length, and a 1-µm period for a 50% filling rate. Any other structure forming a network may also be used.

Diffraction grating 33 is preferably placed upstream of the tip of submicronic waveguide 29, far from the coupling region between waveguides 25 and 29. This avoids the generation of losses at the level of tip 31 where the light beam is confined or deconfined between wide waveguide 25 and submicronic waveguide 29. Thus, in the shown example, diffraction grating 33 is located close to the end of waveguide 25 opposite to that intended to be coupled to the optical fiber.

In FIG. 3, the lateral and upper insulations of waveguides 25 and 29 have not been shown. Such insulations may be formed of an insulating layer, for example, made of silicon oxide, having a thickness on the order of 2 µm and surrounding waveguides 25 and 29. It should also be noted that any known index matching device may be used between the optical fiber and the associated wide waveguide to limit light losses between these elements, for example, liquid structures.

The device of FIG. 3 enables to align an optical fiber on waveguide 25 in several ways, some of which will be described hereafter in relation with FIGS. 4 to 6.

Figure 4:
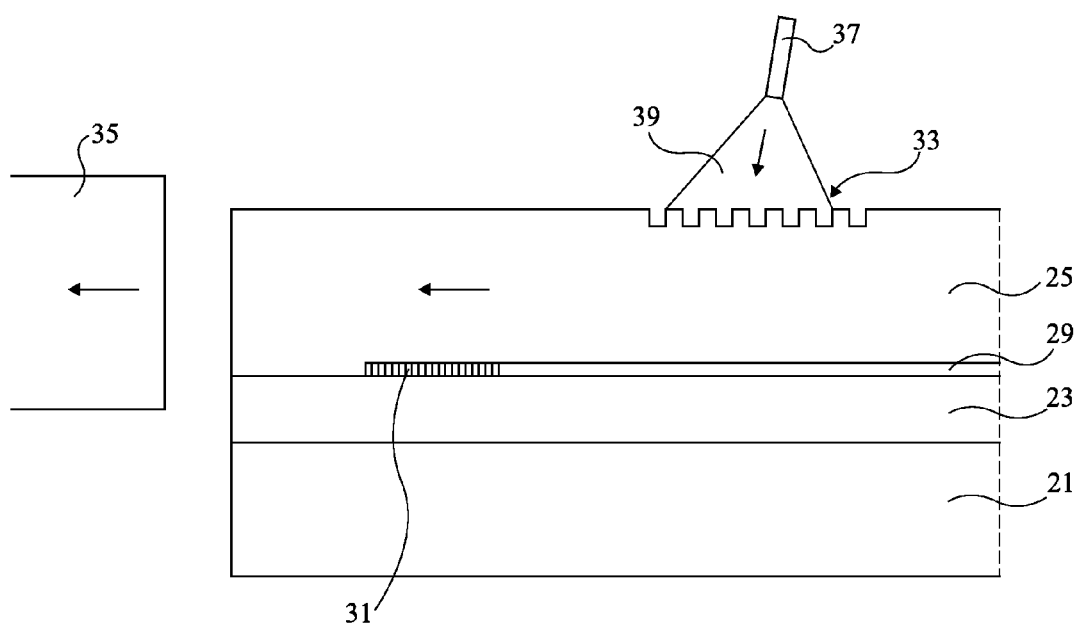
FIGS. 4 to 6 illustrate different methods for aligning an optical fiber on a device according to an embodiment of the present invention.

FIG. 4 is a cross-section view illustrating a first method enabling to align an optical fiber 35 and wide waveguide 25 of FIG. 3. A light source 37, for example, a laser, provides a light beam 39 towards the surface of diffraction grating 33. A portion of the light beam reaching diffraction grating 33 is transmitted by said network into wide waveguide 25. Wide waveguide 25 transmits the light to its end where optical fiber 35 is desired to be aligned. Optical fiber 35 and wide waveguide 25 are aligned when the optical fiber conducts a maximum light intensity originating from the wide waveguide. Thus, to align the optical fiber, the light intensity that it conducts is detected at its output and the alignment is obtained when this light intensity is maximum.

Advantageously, to align optical fiber 35 on wide waveguide 25, it is not necessary to accurately illuminate the diffraction grating. Indeed, it is sufficient for light source 37 to illuminate diffraction grating 33, even partially, so that light comes out of wide waveguide 25 and enables to optimize the relative positioning of optical fiber 35. Further, advantageously, light beam 37 may have any wavelength, for example, in the visible or infrared range. Indeed, light beam 37 does not need to have a specific wavelength to be at least partly coupled in waveguide 25 by the diffraction grating.

Figure 5:
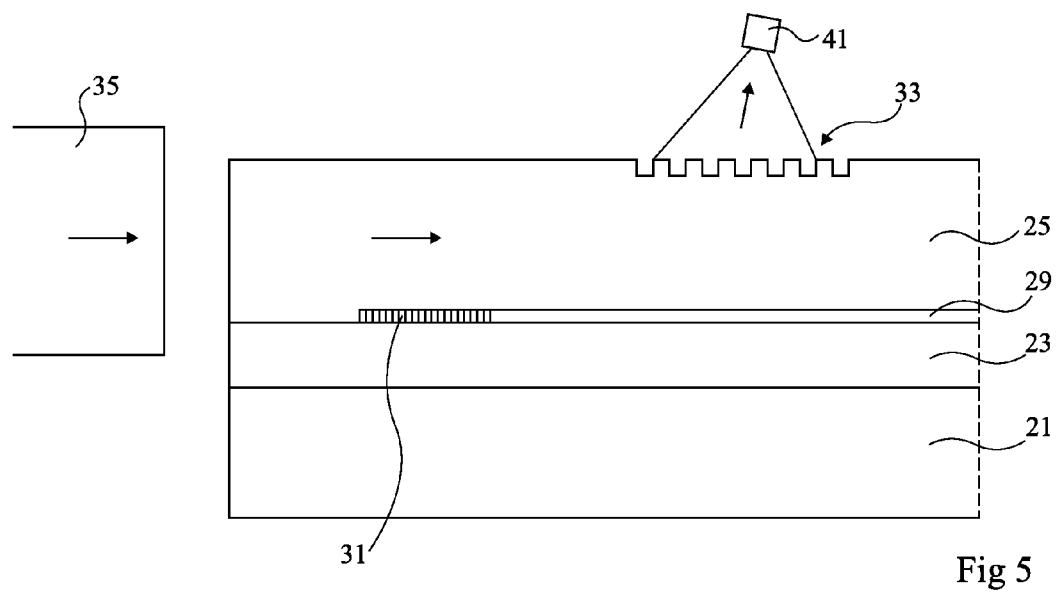

FIG. 5 illustrates another method for aligning an optical fiber 35. In this method, optical fiber 35 illuminates wide waveguide 25. When optical fiber 35 is aligned on wide waveguide 25, said waveguide conducts light provided by the optical fiber towards diffraction grating 33, which delivers a light beams to the outside, towards a photodetector 41. Thus, the proper alignment of optical fiber 35 on wide waveguide 25 is detected by selecting the position of optical fiber 35 enabling the detection of a maximum light intensity at the level of photodetector 41. It can be avoided for the beam provided by optical fiber 35 to the wide waveguide to be coupled in submicronic waveguide 29 via tip 31. For this purpose, the optical fiber may provide a light beam having a wavelength external to the operating bandwidth of the anamorphotic coupling device. It may also be provided for the optical fiber to conduct a light beam with a polarization state which is not coupled by the anamorphotic device.

Figure 6:
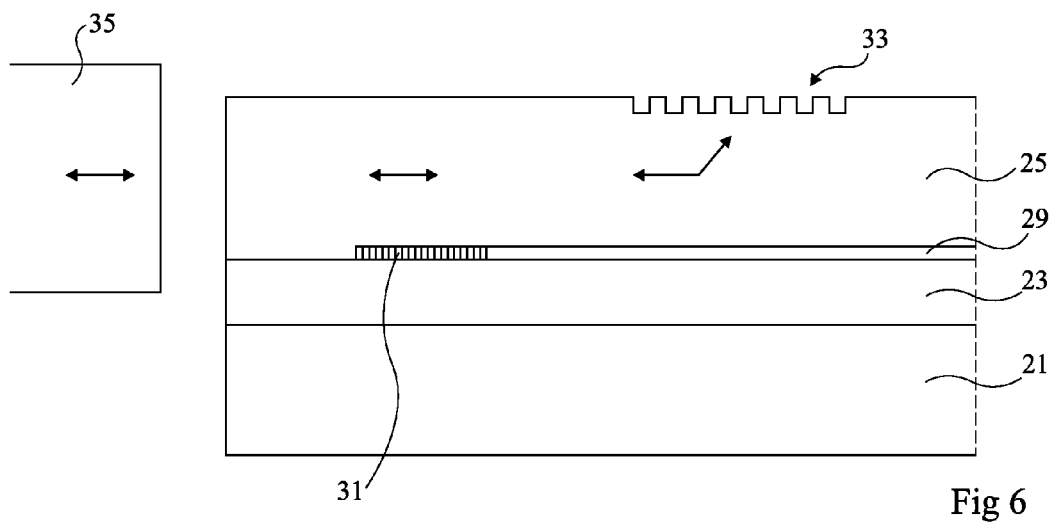

FIG. 6 illustrates another method for aligning optical fiber 35 on wide waveguide 25. In this method, optical fiber 35 illuminates optical waveguide 25 and the light reflected by diffraction grating 33 is detected. Indeed, when a light beam penetrates into wide waveguide 25 towards diffraction grating 33, part of this light beam is transmitted by the diffraction grating to the outside of the device, part of it follows its path into wide waveguide 25 and part of the light is reflected in wide waveguide 25 by diffraction grating 33. Thus, optical fiber 35 is aligned when the light beam that it provides penetrates into wide waveguide 25, partially reflects on diffraction grating 33, returns into wide waveguide 25, and is recovered in optical fiber 35. In the same way as in the case of FIG. 5, in this method, the wavelength and/or the polarization of the light beam provided by optical fiber 35 may be provided to minimize the optical coupling in submicronic waveguide 29. Any desired wavelength may also be used for the alignment.

Figure 7:
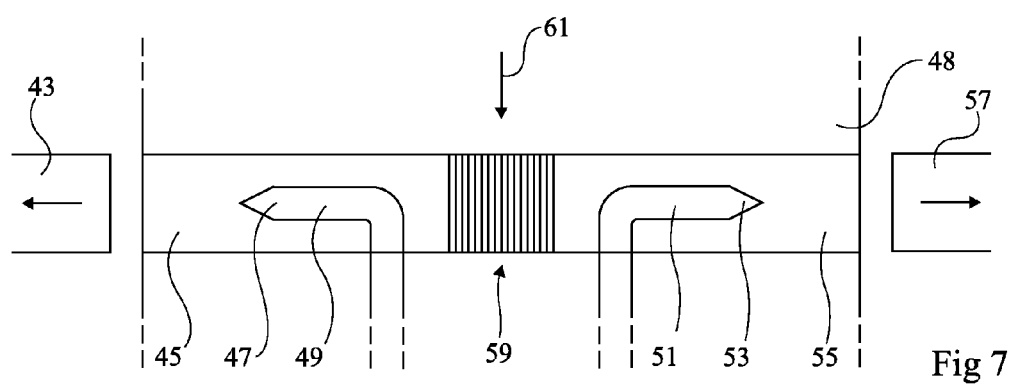
FIG. 7 illustrates a variation of a method according to an embodiment of the present invention enabling to align two optical fibers in one step.

FIG. 7 is a top view illustrating a variation of the above methods in which a single light introduction-extraction diffraction grating is used to align an input optical fiber and an output optical fiber of an integrated optical circuit. The device comprises an input optical fiber 43 which is coupled, via a wide waveguide 45 and a submicronic tip 47 formed on a support 48, to a submicronic waveguide 49 formed on this same support. Submicronic waveguide 49 is partially shown and comprises, at the surface of support 48, a curved portion which brings it towards an integrated optical circuit, not shown. An output of the integrated optical circuit is connected to the input of a submicronic optical waveguide 51 which is coupled, via a submicronic tip 53 and a wide waveguide 55 formed on support 48, to an output optical fiber 57.

Wide waveguides 45 and 55 join on support 48 and a diffraction grating 59, of any known type enabling to introduce light into wide waveguides 45 and 55, is formed, at the surface of wide waveguides 45 and 55, at the intersection thereof. Diffraction grating 59 is illuminated by a light beam 61 originating from a light source, not shown, and light beam 61 penetrates, via the diffraction grating, into wide waveguides 45 and 55 towards optical fibers 43 and 57. To align optical fibers 43 and 57 on wide waveguides 45 and 55, the position in which the optical fibers receive a maximum light intensity is detected. It should be noted that, as in the case of FIG. 4, light beam 61 does not need to be perfectly aligned on the diffraction grating for the alignment so that it is enough for part of this beam to be coupled in wide waveguides 45 and 55 to enable the alignment of optical fibers 43, 57. Further, the wavelength of beam 61 may be different from that used in the integrated optical circuit.

Figure 8:
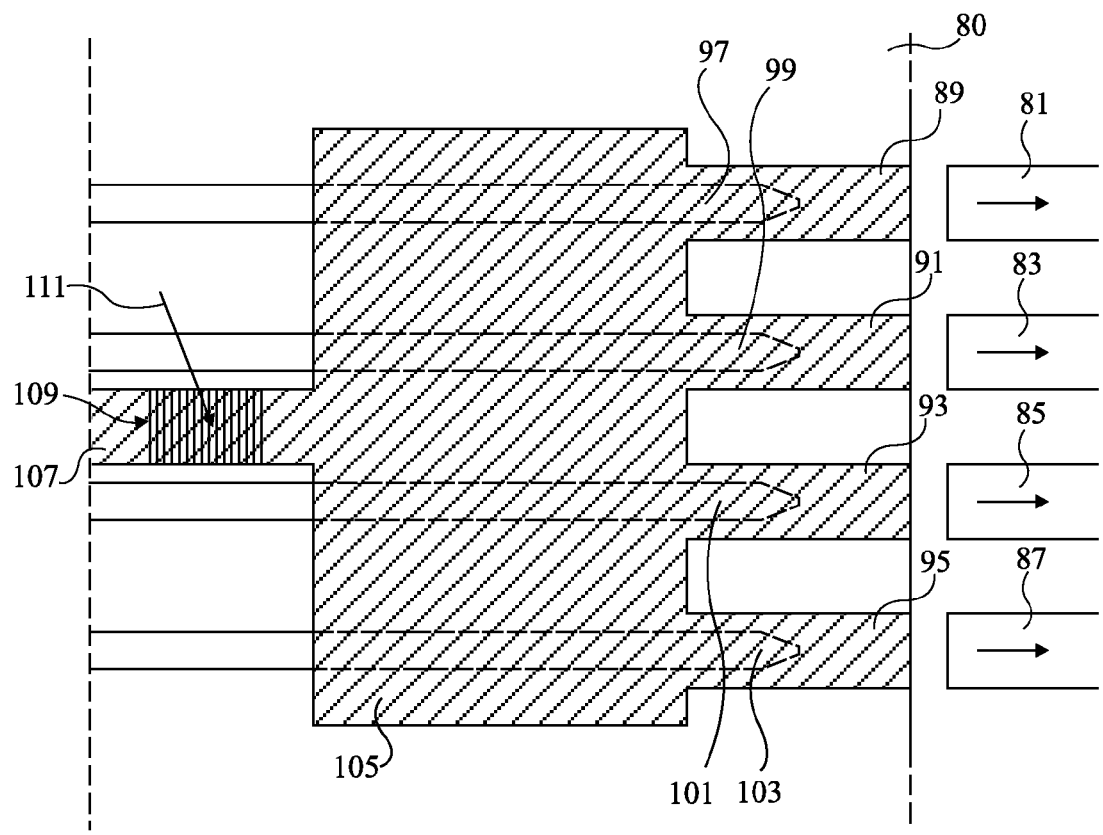
FIG. 8 illustrates a variation of a method according to an embodiment of the present invention in which several optical fibers are aligned in a single step.

FIG. 8 illustrates, in top view, a variation enabling to align several optical fibers on several wide waveguides in a single step. Four optical fibers 81, 83, 85, 87 intended to be aligned on first ends of wide waveguides, respectively 89, 91, 93, 95 are formed on a support 80. In the shown example, each wide waveguide 89, 91, 93, 95 is associated with a submicronic waveguide, respectively 97, 99, 101, 103, via adapted tips (inverse tapers). The second ends of wide waveguides 89, 91, 93, 95 are connected, at the surface of insulating support 80, to a beam-dividing device 105. An additional wide waveguide 107, formed on support 80, is connected to the input of divider 105. It should be noted that divider device 105 is not shown in detail in FIGS. 8 and 9 and that any type of known beam dividing device may be used to enabling the coupling between waveguide 107 and waveguides 89, 91, 93, 95.

A diffraction grating 109, formed at the surface of wide waveguide 107, enables to couple light originating from a light source (arrow 111) towards wide waveguide 107. To align optical fibers 81, 83, 85, 87, the diffraction grating is illuminated (arrow 111) which transmits part of this light to wide waveguide 107. The light beam then penetrates into dividing device 105 which conveys it to each of wide waveguides 89, 91, 93, 95. The alignment of optical fibers 81, 83, 85, 87 is obtained in the same way as in the case of FIG. 7, when the optical fibers conduct a maximum light intensity.

Figure 2:
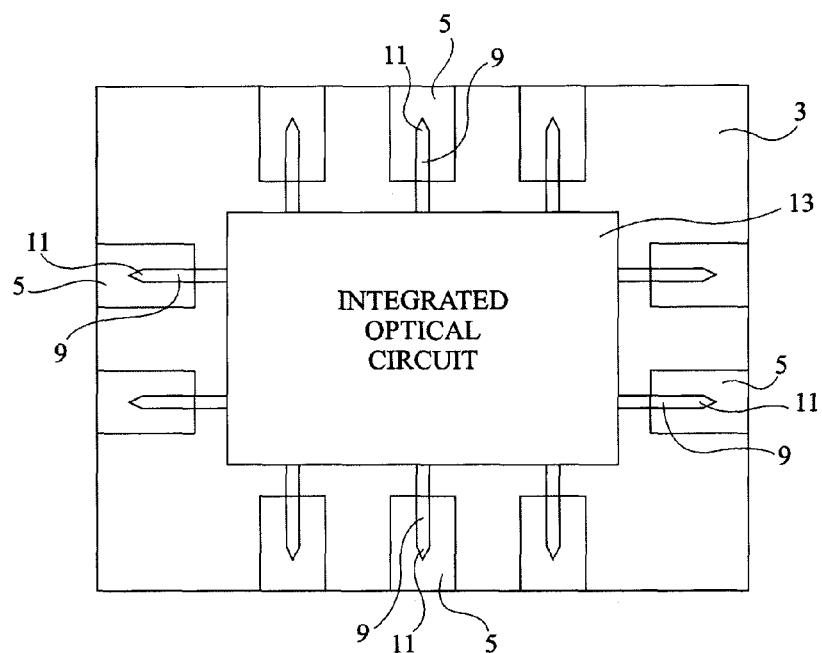
FIG. 2, previously described, is a simplified diagram illustrating the optical inputs/outputs of a chip on which an integrated optical circuit is formed.

Thus, the device of FIG. 8 enables to align several optical fibers. It should be noted that a combination of the devices of FIGS. 7 and 8 can enable to align all the input/output optical fibers of an integrated optical circuit, for example, of a circuit such as that in FIG. 2.

Various specific embodiments of the present invention have been described. Various alterations and modifications will occur to those skilled in the art. In particular, a specific type of wide waveguide has been described herein. It should be understood by those skilled in the art that the present invention applies to the alignment of an optical fiber on any type of wide waveguide. The present invention also applies to any system for coupling a wide waveguide and a submicronic waveguide.

Further, a system of introduction-extraction-sending back of light in the form of a diffraction grating formed at the surface of the wide waveguide has been discussed herein. It should be noted that any other known device enabling to introduce-extract-send back light in a wide waveguide, independently from the presence of a submicronic waveguide formed in the wide waveguide, may also be used instead of the diffraction grating. It should however be noted that the use of the diffraction grating provides a decreased bulk and an optimized coupling.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for aligning an optical fiber and a first optical waveguide comprising:
    placing an end of the optical fiber in front of a free end of the first optical waveguide, the first optical waveguide being coupled to a second optical waveguide of smaller cross-section on a side of a second end of the first optical waveguide, opposite the free end;
    introducing a light beam originating from a light source into the first optical waveguide by means of a light coupling device formed at a surface of the first optical waveguide towards the optical fiber and independently from the second optical waveguide,
    detecting light transmitted from the first optical waveguide to the optical fiber, and
    determining a position of the optical fiber involving the maximum light intensity in the light detected.

2. The method of claim 1, wherein the light coupling device is a diffraction grating.

3. The method of claim 1, wherein the introduced light beam has any wavelength in the visible or close infrared range.

* * * * *